Aug. 11, 1964
H. A. SEESSELBERG
3,144,046
WATERFLOOD MONITOR AND CONTROL SYSTEM
Filed Feb. 25, 1963
3 Sheets-Sheet 1
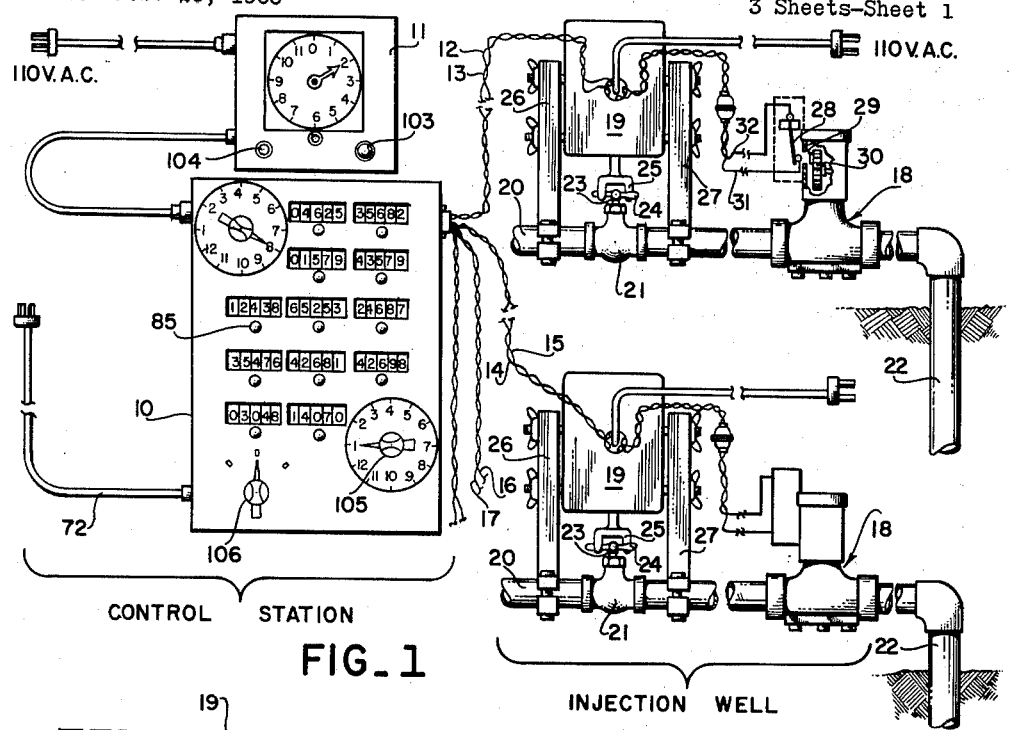
FIG_1
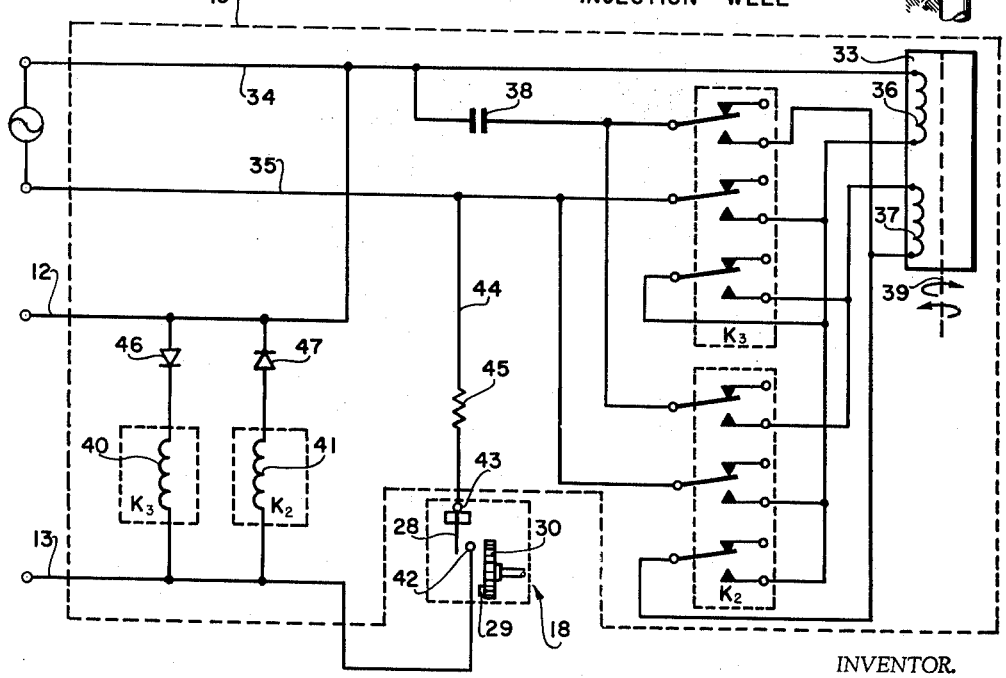
FIG_2
INVENTOR.
HENRY A. SEESSELBERG
BY
George A. Sullivan
Agent

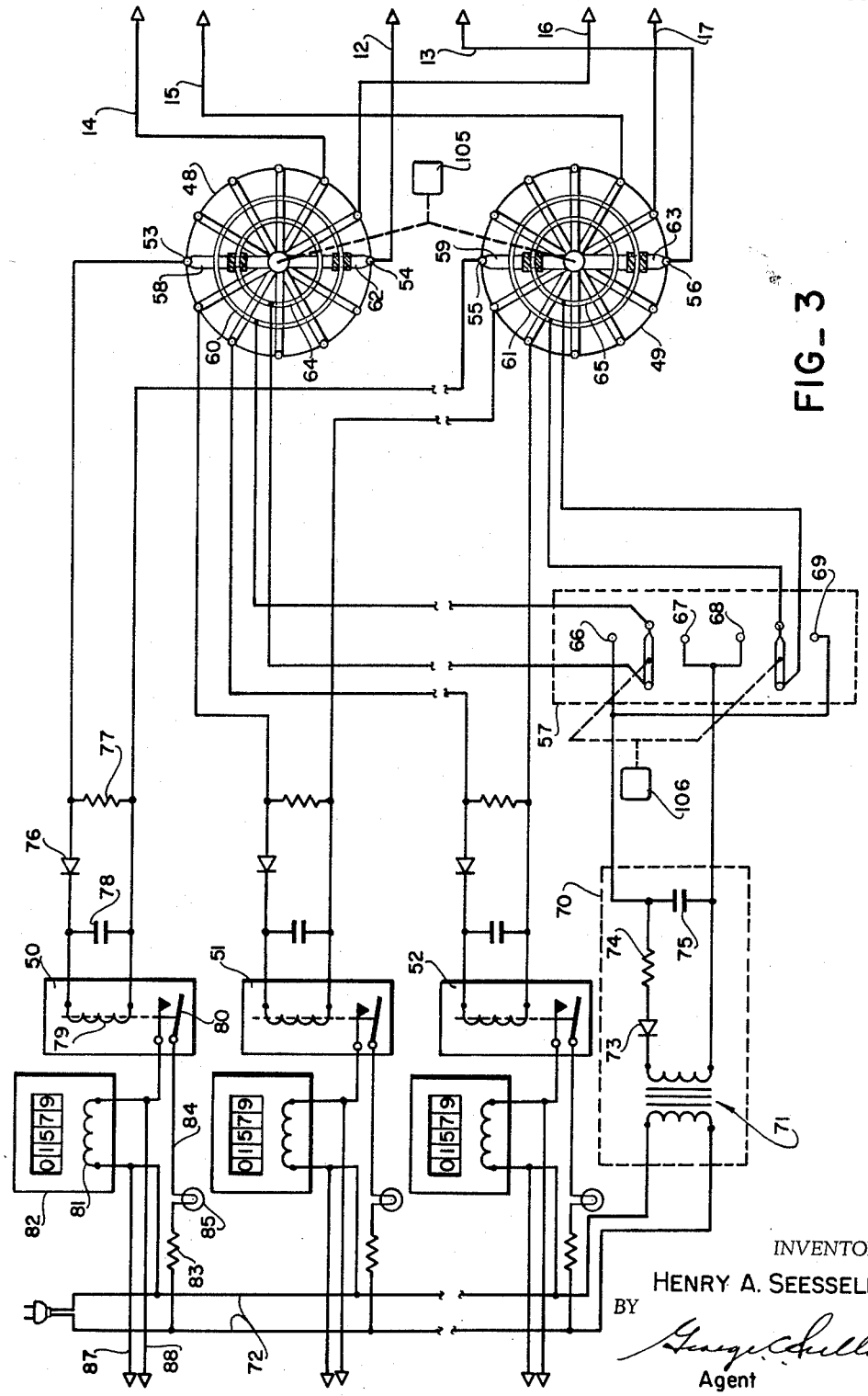

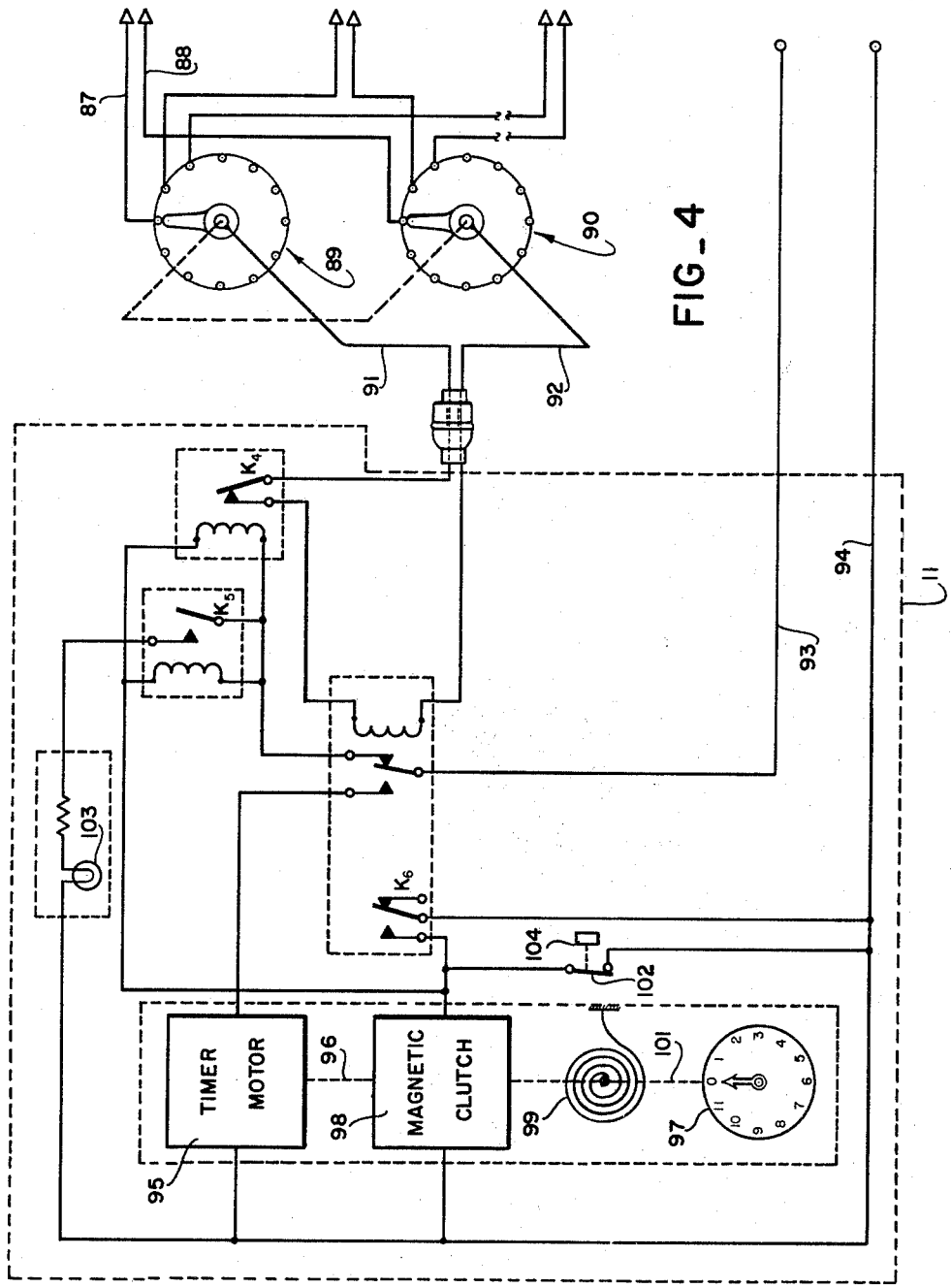

3,144,046
WATERFLOOD MONITOR AND CONTROL
SYSTEM
Henry A. Seesselberg, South Plainfield, N.J., assignor to
Lockheed Aircraft Corporation, Burbank, Calif.
Filed Feb. 25, 1963, Ser. No. 260,469
10 Claims. (Cl. 137—551)

This invention relates to a system and apparatus for remotely controlling fluid flow through a plurality of independent pipe lines and more particularly to a monitor and control device for regulating the injection of water into the ground at a plurality of wells in a waterflood oil field.

In low-yield oil fields, the method of waterflooding is used to stimulate production to a profitable level. This method consists of injecting large volumes of water into the ground at several points proximate the producing oil well. The water permeates the oil-bearing sand and forces the oil to flow out of the sand with the injected water. The mixture is then pumped out of the ground and by separation the oil is recovered.

The amount of water injected must be controlled for several reasons. Since the lease adjacent to the one being flooded might be owned by another company, it is desirable to limit the amount of possible "free" waterflood stimulation the next lease might experience. Also, there is a specific injection rate for each well which produces oil at an optimum rate. Too little water does not thoroughly permeate the sand and too much water tends to build up pressure and make water tunnels through the sand, providing little contact with the captive oil.

Waterflood operators, then, need to monitor and control the rate of water flow at each of a plurality of injection points (sometimes as many as twenty to eighty injection points) in a field. At present, a man rides around from injection point to injection point and times, with a stopwatch, the rate at which a positive displacement water meter dial moves. He then adjusts, if necessary, a flow control valve until the rate matches his desired schedule. This has several obvious disadvantages among which is that of requiring much travel time from point to point.

The marginal economics of the waterflood operation severely restricts the amount to be spent on automation, ruling out the use of conventional systems which would require the use of many expensive motorized valves, electric flowmeters and the like.

The system shown and described herein permits performing the monitor and control functions at a remote, central control station, obviating on-site inspection and activity. The well injection unit consists of a modified water meter register utilizing the conventional positive displacement type meter presently in use and a valve actuator which may be mounted on the existing valve without modification. The central control station equipment consists of one valve control unit, one pulse interval timer, and a totalizing counter for each injection well.

A basic object of this invention is to provide a waterflood monitor and control system for remote regulation of flow rate which is simple to operate, utilizing existing injection well meters and valves.

Another object of this invention is to provide a remote system capable of both monitoring and regulating the rate of fluid flow at any of a plurality of injection wells through use of common field telephone wire pairs between each injection well and the central control station.

Another object of this invention is to provide a switching system permitting the use of a single valve control switch for regulating the flow valve at any of a plurality of injection wells without interrupting flow monitoring of other wells.

Still another object of this invention is to provide a system which can compute total flow at each of a plurality of injection wells by counting the same pulses generated for measuring flow rate.

Further and other objects will become apparent from a reading of the following detailed description, especially when considered in combination with the accompanying drawings, wherein like numerals refer to like parts.

In the drawing:

FIGURE 1 shows the general arrangement of components in the waterflood monitor and control system of this invention;

FIGURE 2 is a schematic circuit diagram of the water meter and valve actuator well injection unit;

FIGURE 3 is a schematic circuit diagram for the valve control unit, totalizing counters and selector switches of the central control station equipment;

FIGURE 4 is a schematic circuit diagram for the pulse interval timer and associated selector switch arrangement which, together with FIGURE 3, shows the complete circuitry for the central control station portion of the system.

The central control station equipment is represented in FIGURE 1 by monitor and control unit 10 together with its associated pulse interval timer 11. Field telephone wire pairs, such as 12 and 13, 14 and 15, 16 and 17, one pair for each injection well, couple the central control station with each injection well unit consisting of water meter register 18 and valve actuator 19.

A pipeline 20 for each injection well feeds water under pressure through a throttle or flow control valve 21 and a water meter register 18 to control and measure the amount of water injected into the ground at the well opening shown as pipe 22.

Flow control valve 21 at each injection well is adjustable to control flow rate by rotating valve stem 23. Rotation of valve stem 23 in one direction increases the flow rate, while rotation in the opposite direction decreases flow rate. A handle 24 on the free end of valve stem 23 receives a bifurcated member 25 projecting from valve actuator unit 19. Valve actuator unit 19, through member 25, is caused to drive valve stem 23 in either direction on command, as hereinafter more particularly described. As shown in FIGURE 1, valve control unit 19 is suitably mounted over valve 21 by means such as brackets 26 and 27 secured to pipe 20.

Water meter 18, which, as previously indicated, is of the conventional positive displacement type with a dial indicator registering the quantity of fluid passing therethrough, is modified in accordance with the teachings of this invention to incorporate a switch 28 which is actuated on each passage of a measured quantity of fluid. As shown in FIGURE 1, a small permanent magnet 29 is mounted on one of the gears 30 in meter 18 which gear turns one revolution on each passage of a measured quantity of fluid, such as every one-tenth barrel. Switch 28, a normally open magnetic reed switch, is mounted adjacent gear 30 so as to be momentarily closed by magnet 29 on each revolution of gear 30. A wire pair 31 and 32 couples reed switch 28 to the valve actuator unit circuitry, as best shown in FIGURE 2.

Referring now to FIGURE 2 and the details of the valve actuator unit 19, a reversible motor 33 is coupled to a suitable source of electrical potential, such as a 110 volt alternating current (60 cycle) line as represented by wire pair 34 and 35, through a pair of TPDT (triple pole double throw) relays $K_2$ and $K_3$. In the particular arrangement shown, motor 33 is a reversible capacitor-type motor, rated for operation on 110 volts, 60 cycles alternating current with a built-in speed-reduction gear train, such as Model 1007–4SY, manufactured by the Borg Equipment Division of Amphenol-Borg Electronics Corporation, Janesville, Wisconsin. This particular motor has two windings 36 and 37 wherein reversal of the motor is accomplished by reversing the connection of the bottom winding 37 with capacitor 38 and the line voltage wire pair 34 and 35. The top winding 36 is wired the same way at all times and is only disconnected from the line voltage in wire pair 34 and 35 when the motor is to be shut off. The contacts of TPDT relay $K_3$ couple windings 36 and 37 of motor 33 to the line voltage in wire pair 34 and 35 to effect rotation of motor shaft 39 in one direction when $K_3$ relay coil 40 is energized. Rotation of motor output shaft 39 in the opposite direction is effected by energizing the $K_2$ relay coil 41, reversing the connection of the bottom winding 37 with the line voltage wire pair 34 and 35. The motor is shut off when both $K_2$ and $K_3$ relays are de-energized.

Motor shaft 39 of valve actuator unit 19 connects with bifurcated member 25 for driving flow valve 21, as shown in FIGURE 1. Although a particular motor is described, any reversible motor of either the alternating or direct current types may of course be used without departing from these teachings.

Still referring to FIGURES 1 and 2, valve actuator unit 19 is electrically coupled to the central station monitor and control unit 10 through field telephone wire pair 12 and 13. Wire 12 connects with lead 34 of the wire pair supplying the alternating current motor drive voltage. Wire 13 connects with one side 42 of reed switch 28 on meter 18. The other side 43 of reed switch 28 connects with wire 35 of the wire pair supplying the alternating current motor drive voltage through lead 44 and a voltage dropping resistor 45. When reed switch 28 is momentarily closed on each revolution of gear 30 in meter 18, a low level alternating current pulse is produced in wires 12 and 13 for monitoring fluid flow at the central control station.

The same wire pair 12 and 13 which is used to carry the fluid flow measuring pulses is also used to transmit signals from the central control station to actuate relays $K_2$ and $K_3$ in the motor drive circuit. Specifically, relay coil 40 of relay $K_3$ is connected across field telephone wire pair 12 and 13 in series with a diode 46 allowing current flow in only one direction, while relay coil 41 of relay $K_2$ is connected across field telephone wire pair 12 and 13 in series with a diode 47 allowing current flow only in the opposite direction. Hence, a direct current voltage of a magnitude above the threshold level for actuating relays $K_2$ or $K_3$ will cause motor 33 to drive flow valve 21 in either direction, depending upon the polarity of the applied signal.

Voltage dropping resistor 45 holds the flow measuring pulse to a voltage level less than that which would cause the two relays $K_2$ and $K_3$ connected across the signal line to chatter. A resistor having a value of 6.8K ohms has been found adequate for this purpose where $K_2$ and $K_3$ are Advance relays GHA/3C/24DC manufactured by the Elgin National Watch Company of Burbank, California and diodes 46 and 47 are of the IN 3748 type.

Referring now to the central monitor and control unit as shown in FIGURES 3 and 4, field telephone wire pairs 12 and 13, 14 and 15, 16 and 17, etc., one pair for each injection well, connect with a pair of ganged selector switches 48 and 49 which complete a circuit from each injection well to a sensitive D.C. relay such as 50, 51 and 52, one for each injection well whose water flow is to be monitored. Selector switches 48 and 49 are of the circuit opening type such as Mallory No. 1400L Circuit Opening Switch manufactured by P. R. Mallory & Company, Inc., Indianapolis, Indiana. With this particular switch, the circuit from each valve actuator unit to the associated relay in the control unit is completed through all but one pair of switch contacts to a selected injection well; the selected injection well being the one which is to be adjusted for a different flow rate. This particular circuit through selector switches 48 and 49 differs from the other direct circuits through the switches in that corresponding contacts 53 and 54 and 55 and 56 are not electrically connected to the other as a pair to complete a circuit to the associated relay, except through a by-pass circuit which includes motor control double throw-triple pole switch 57. With switch 57 in the position shown in FIGURE 3, it is seen field telephone wire pair 12 and 13 completes a circuit to relay 50 through selector switches 48 and 49 via motor control switch 57. This is schematically illustrated in FIGURE 3, wherein arm 58 of selector switch 48 and arm 59 of selector switch 49 each make electrical contact with slip rings 60 and 61 respectively, while switch arm 62 of selector switch 48 and arm 63 of selector switch 49 electrically engage slip rings 64 and 65 respectively. Hence, contacts 53 and 54 and 55 and 56 of selector switches 48 and 49, respectively, are electrically connected only by connecting the two slip rings of each switch, which connection is accomplished through motor control switch 57.

While selector switches of the Mallory type are referred to above, it should be understood that any selector switch which is functionally operable as shown in FIGURE 3 would be suitable; the showing in FIGURE 3 being intended to illustrate generally the type of switching preferred for the particular application. It should also be understood various modifications of the disclosed switching arrangement may be made, such as eliminating switch 49, for example, resulting in one wire of each wire pair being coupled directly with the motor control switch 57. While such modifications would not obtain the full benefits of these teachings in terms of system accuracy without otherwise electrically isolating the field telephone pairs, they are considered as variations within the scope of the invention.

With switches 48 and 49 in the positions shown in FIGURE 3, field telephone wire pair 12 and 13 may be disconnected from relay 50 by changing the pole position of motor control switch 57 from the position shown to either of the other two poles 66 or 67 and 68 or 69. When the switch is moved to either of these pole positions, a circuit is completed from a direct current motor control voltage source 70 to motor control relays $K_2$ and $K_3$ through field telephone wire pair 12 and 13. The polarity of this motor control voltage applied to the motor control relays at the opposite end of field telephone wire pair 12 and 13 is either positive or negative, depending upon whether motor control switch 57 is made to complete the circuit through poles 66 and 68 or through poles 67 and 69. As previously described, one or the other of relays $K_2$ and $K_3$ is energized by the motor control voltage, depending upon its polarity. Hence, switch 57 provides the means for remotely regulating the flow valve at any of the plurality of injection wells. To select a different injection well, one need merely reposition selector switches 48 and 59 so that arms 58, 62 and 59, 63 are aligned with the contacts connecting the control unit with the valve actuating unit of the different injection well.

The direct current motor control voltage supply is derived by rectifying and smoothing the output of an A.C. transformer 71 coupled to a 110 v. alternating current line 72. Rectification of the transformer output is accomplished by diode 73 while smoothing of the rectified signal is effected by the series-parallel resistor 74-capacitor 75-network.

The flow monitoring function of the system is accomplished by actuating direct current relays such as 50, 51 and 52, one for each injection well, on each application of a flow measuring pulse from the associated flowmeter. The flow measuring pulse, a low level alternating current signal, is passed through a diode rectifier 76 and smoothed by the resistor 77-capacitor 78 network to energize relay coil 79 for the duration of each such pulse. During the periods relay coil 79 is energized, switch 80 of the relay is closed, completing a circuit from the 110 volt alternating current supply line 72 through the stepping coil 81 of counter 82. The counter may be of any suitable type, such as General Controls counter CE70AN502, with the proper voltage level for the counter being obtained through the use of a suitable voltage dropping resistor 83 in line 84 connecting the main power line 72 with the counter. A glow tube 85 may also be employed in line 84 to provide a visual indication of the application of flow measuring pulses to the monitor circuit.

A counter such as 82 is provided at the central control station for each injection well valve actuator unit to count the total number of flow measuring pulses received over any given period of time and thus provide an indication of the total amount of water injected at each of the plurality of injection wells.

To determine flow rate, the time interval between flow measuring pulses is measured and the flow rate calculated. Where the pulses measure 0.1 barrel flow, for example, flow rate is calculated as 1/time for 0.1 barrel flow. This determination can be made manually with a stopwatch measuring the time interval between light flashes from glow tube 85 or, more conveniently, the rate may be automatically calculated with the pulse interval timer or intervalometer 11 shown in FIGURE 4. Wire pair 87 and 88 connected across coil 81 of each counter 82 as shown in FIGURE 3 is coupled to a pair of ganged selector switches 89 and 90. Selector switches 89 and 90 connect leads 91 and 92 of pulse interval timer 11 with the wire pair 87 and 88 from any of the plurality of counters. Thus, the energy pulses applied to a particular counter are also applied through ganged stepper switches 89 and 90 to the pulse interval timer 11. Functionally, the pulse interval timer receives a first pulse to initiate timer operation and a second pulse to terminate timer operation. By properly calibrating the timer, it may be made to indicate flow rate in the desired terms for direct reading, such as barrels per hour or barrels per day.

Still referring to FIGURE 4, the same relay, such as 50 in FIGURE 3, which energized the counter, also energizes the DTDP (double throw-double pole) ratchet relay $K_6$ through initially closed latching relay $K_4$. When $K_6$ is energized by the first pulse, it removes current from $K_4$ and a second initially opened ratchet relay $K_5$ as supplied by 110 v. alternating current supply lines 93 and 94. Since $K_4$ and $K_5$ are latching relays, they hold their last position until current is switched off and then on again. Therefore, when $K_6$ is initially energized by the first pulse to remove current from $K_4$ and $K_5$, the position of their contacts as shown in FIGURE 4 remains unchanged. Energizing ratchet relay $K_6$, however, couples the 110 volt alternating current line to a timer motor 95, energizing the same. The output shaft 96 of timer motor 95 drives a dial indicator 97 through a magnetic clutch 98. The timer motor may be disengaged from the dial indicator 97 by opening the circuit through the magnetic clutch. A suitable return spring 99 on dial indicator drive shaft 101 returns the indicator to a zero position on each decoupling of the magnetic clutch. Timer motor 95, dial indicator 97, magnetic clutch 98 and zero reset return spring 99 are commercially available as a unit, such as the Haydon Acro-Timer Model No. BP1101, manufactured by General Time Corporation of Torrington, Connecticut.

A normally closed, manually operable switch 102 completes a circuit energizing magnetic clutch 98. This momentary switch is manually opened to disengage the clutch only for performing the timer zero reset operation.

To prevent inadvertent resetting of the timer during a reading, switch 102 is bridged when $K_6$ is energized by receipt of the first pulse. When the first pulse has passed, $K_6$ still maintains its contact position, as do relays $K_4$ and $K_5$. On receipt of the second pulse, $K_6$ reverses its contact position back to the position shown in FIGURE 4. This applies current to $K_4$ and $K_5$ again while de-energizing the clock timer motor 95. $K_4$ at this time opens up, allowing no more pulses through, and $K_5$ turns on a lamp 103, which indicates that the two pulses have had their interval timed and the reading is complete.

In order to take another reading, momentary switch 102 must be opened. This releases the timer motor magnetic clutch 98 resetting indicator 97 to zero and simultaneously resets $K_4$ and $K_5$ for the next pulse pair.

In operation of the system, the magnetic reed switch 28 on meter 18 at each injection well is closed on each injection well is closed on each passage of a measured quantity of fluid through the meter. These reed switch closures impress a series of fluid measuring pulses (low level alternating current pulses) on the associated field telephone wire pair. This fluid measuring pulse train from each injection well valve actuator unit is rectified and filtered and applied to a sensitive direct current relay such as 50, 51 and 52 in the central monitor and control unit. These relays such as 50, 51 and 52 close the circuit to its associated impulse counter 82 to add one count for each measured quantity of fluid. The counters thus provide a record of totalized flow at each injection well.

If the operator wishes to read the flow rate for a particular injection well, pulse interval timer unit 11 is connected to the counter circuit for that particular well through ganged selector switches 89 and 90. After opening switch 102 in the timer unit by manually pressing on button 104 to zero the timer dial and otherwise condition the unit to receive a fluid measuring pulse, a rate reading is taken. This is accomplished by measuring the time displacement between two successive pulses and displaying the same on the face of the timer dial.

When the operator wishes to adjust the flow rate at a particular injection well, he must first rotate selector switches 48 and 49 through knob 105 to couple the motor control switch 57 to that particular injection well monitoring circuit and decide which direction (open or closed) he wishes the flow valve 21 to go. He then must rotate motor control switch 57 in the proper direction through knob 106. One direction will make one signal line positive with respect to the other and the other direction will reverse the signal line polarity. This in turn will cause either relays $K_2$ or $K_3$ to close, depending upon the polarity and arrangement of series diodes 46 and 47. Relay $K_2$ or $K_3$ will connect the motor to capacitor 38 and the 110 v. alternating current line in such a way as to make the motor drive clockwise or counter-clockwise. The motor operably connecting with the flow valve thus adjusts the flow rate.

While the invention has been shown and described in connection with a specific embodiment, it should be understood that certain alterations, modifications and substitutions such as those suggested herein may be made to the instant disclosure without departing from the true spirit and scope of the invention as defined by the appended claims.

I claim:

1. In a waterflood oil field having at least one fluid injection well proximate an oil producing well for stimulating the recovery of oil, a system for remotely monitoring and controlling fluid flow comprising, a pipeline for each fluid injection well for feeding fluid thereto under pressure, a flow valve in said pipeline adjustable to regulate flow rate, a flowmeter in said pipeline metering the quantity of fluid passing therethrough, a switch associated with said flowmeter for actuation on each passage of a measured quantity of fluid, circuit means coupled to said switch and generating a pulse each time the switch is actuated, integrating counter means coupled to said circuit means and being responsive to the pulses for registering the total measured quantity of fluid injected, intervalometer means coupled to said circuit means and being responsive to the time interval between at least two of said pulses to measure rate of flow, reversible motor means coupled to each flow valve for regulation of the flow rate, and motor control means coupled to said circuit means and selectively controlling said motor means.

2. In a waterflood oil field having a plurality of fluid injection wells proximate an oil producing well for stimulating the recovery of oil, a system for remotely monitoring and controlling the fluid flow at each fluid injection well comprising, a pipeline for each injection well feeding fluid thereto under pressure, a flow valve in each pipeline adjustable to regulate flow rate, a flow meter in each pipeline metering the quantity of fluid passing therethrough, a normally open switch attached to each flowmeter and being momentarily closed by the flowmeter on each passage of a measured quantity of fluid, a plurality of indicators, one for each normally open switch, a plurality of independent circuits coupling each normally open switch to its associated indicator and remotely registering momentary closures of the switch, a plurality of reversible motors, one coupled to each flow valve and being operable to regulate the flow rate, a motor control circuit, and switch means selectively coupling said motor control circuit to any one of said plurality of motors for energizing the same through said plurality of independent circuits.

3. A remote monitor and control system for waterflood oil fields having at least one fluid injection well proximate an oil producing well for stimulating the recovery of oil comprising, a pipeline for each said fluid injection well and feeding fluid thereto under pressure, a flow valve in said pipeline adjustable to regulate flow rate, a flowmeter in said pipeline metering the quantity of fluid passing therethrough, a normally open switch attached to said flowmeter and being momentarily closed by the flowmeter on each passage of a measured quantity of fluid, a reversible motor connecting with said flow valve and being operable for adjusting the valve to regulate flow rate, indicator means, a source of electrical potential, means coupled to said source of electrical potential and providing a low voltage of electrical energy, a signal line receiving said low voltage and electrically connecting said indicator means with said switch to register momentary closures of the switch, means coupled to said source of electrical potential and providing a motor control voltage higher than said low voltage, motor control relay means connected to said signal line and being energizable only by said motor control voltage higher than said low voltage, said relay means when energized operably connecting said motor to said source of electrical potential, and selector switch means selectively impressing the motor control voltage on said signal line and energizing said motor control relay means.

4. A device for remotely monitoring and controlling fluid flow through a plurality of independent pipelines comprising, a flow valve in each pipeline adjustable to regulate flow rate, a flowmeter in each pipeline metering the quantity of fluid passing therethrough, a switch on each said flowmeter and actuated by the flowmeter on each passage of a measured quantity of fluid, a motor connecting with said flow valve and operative to adjust the valve, a flow indicator circuit coupled to said switch and registering each actuation of the switch, a motor control circuit, and switch means selectively coupling the motor to said motor control circuit through said indicator circuit for regulating the flow rate.

5. A device as set forth in claim 4 including intervalometer means selectively coupled to said indicator circuit and being responsive to at least two successive actuations of said switch for measuring the time interval therebetween and displaying same in terms of flow rate.

6. A device as set forth in claim 5 wherein said intervalometer includes a timer, relay means responsive to actuations of said switch for starting and stopping said timer, indicator means indicating completion of each timing cycle, and switch means for resetting said timer.

7. A device for remotely monitoring and controlling fluid flow through a plurality of independent pipelines comprising, a flow valve in each pipeline adjustable to regulate flow rate, a flowmeter in each pipeline metering the quantity of fluid passing therethrough, a switch for each said flowmeter and actuated by the flowmeter on each passage of a measured quantity of fluid, a reversible motor coupled to each said flow valve and operative to adjust the valve, a source of electrical potential, flow indicator means for each flowmeter switch, a plurality of circuits connecting with said source of electrical potential and coupling each switch to its associated flow indicator means and registering pulses produced on each actuation of said switch, motor control means, and selector switch means selectively connecting said motor control means to any one of said plurality of circuits and effecting operation of the associated flow valve adjusting motor.

8. A device as defined in claim 7 including means responsive to successive actuations of said switch for indicating flow rate.

9. A device for remotely monitoring and controlling fluid flow through a plurality of independent pipelines comprising, a flow valve in each pipeline adjustable to regulate flow rate, a flowmeter in each pipeline metering the quantity of fluid passing therethrough, a pulse-forming switch for each said flowmeter and actuated by the flowmeter on each passage of a measured quantity of fluid, a reversible motor coupled to each said flow valve and operative to adjust the valve, a source of alternating current electrical potential, flow indicator means for each flowmeter pulse-forming switch, a plurality of circuits connecting with said source of alternating current electrical potential and coupling each pulse-forming switch to its associated flow indicator means and registering pulses produced on each actuation of said pulse-forming switch, a direct current motor control voltage source of both positive and negative polarity, a pair of polarity sensitive direct current motor control relays arranged in parallel in each of said plurality of circuits, one relay being energizable to operate said motor in one direction only on application of said direct current motor control voltage of positive polarity and the other relay being energizable to operate said motor in the opposite direction only on application of said direct current motor control voltage of negative polarity, and selector switch means selectively connecting said direct current motor control voltage source with any one of said plurality of circuits.

10. A device for remotely monitoring and controlling fluid flow through pipelines comprising, a flow valve in the pipeline adjustable to regulate flow rate, a flowmeter in the pipeline metering the quantity of fluid passing therethrough, a normally open pulse-forming switch actuated by the flowmeter on each passage of a measured quantity of fluid, a reversible motor coupled to said flow valve and operative to adjust the valve, a source of electrical potential, flow indicator means coupled to said source of electrical potential through said pulse-forming switch and registering pulses produced on each actuation of said pulse-forming switch, a direct current motor control voltage source of both positive and negative polarity, a motor control switch interposed in the circuit between said flow indicator means and said pulse-forming switch and connecting with said direct current motor control voltage source to selectively apply a motor control voltage of either positive or negative polarity to the circuit, and a pair of motor control relays in the circuit, one relay being energizable to operate said motor in one direction only on application of said direct current motor control voltage of positive polarity and the other relay being energizable to operate said motor in the opposite direction only on application of said direct current motor control voltage of negative polarity.

References Cited in the file of this patent

UNITED STATES PATENTS

| | | |
|---|---|---|
| 1,799,113 | Miedbrodt | Mar. 31, 1931 |
| 2,140,667 | Corsepius et al. | Dec. 20, 1938 |